(12) United States Patent
Zou et al.

(10) Patent No.: US 11,584,460 B2
(45) Date of Patent: Feb. 21, 2023

(54) AUTO-GUIDE TRANSPORT VEHICLE

(71) Applicant: HANGZHOU HIKROBOT TECHNOLOGY CO., LTD., Hangzhou (CN)

(72) Inventors: Xiaochen Zou, Hangzhou (CN); Yonghai Wu, Hangzhou (CN); Hao Liu, Hangzhou (CN)

(73) Assignee: HANGZHOU HIKROBOT CO., LTD., Hangzhou (CN)

( * ) Notice: Subject to any disclaimer, the term of this patent is extended or adjusted under 35 U.S.C. 154(b) by 444 days.

(21) Appl. No.: 16/636,878

(22) PCT Filed: Aug. 7, 2018

(86) PCT No.: PCT/CN2018/099208
§ 371 (c)(1),
(2) Date: Feb. 5, 2020

(87) PCT Pub. No.: WO2019/029537
PCT Pub. Date: Feb. 14, 2019

(65) Prior Publication Data
US 2020/0369501 A1 Nov. 26, 2020

(30) Foreign Application Priority Data

Aug. 9, 2017 (CN) .......................... 201710677905.6

(51) Int. Cl.
*B62D 21/18* (2006.01)
*B62D 63/02* (2006.01)
(Continued)

(52) U.S. Cl.
CPC ............... *B62D 61/10* (2013.01); *B60D 1/34* (2013.01); *B62D 21/18* (2013.01); *B62D 63/02* (2013.01);
(Continued)

(58) Field of Classification Search
CPC ........ B62D 61/10; B62D 21/18; B62D 63/02; B62D 53/028; B62D 63/04; B60D 1/34;
(Continued)

(56) References Cited

U.S. PATENT DOCUMENTS 3,659,666 A     5/1972   Forsyth et al.
5,240,273 A *   8/1993   Stead ....................... B60D 1/34
                                                                        280/489
(Continued)

FOREIGN PATENT DOCUMENTS

CN            203511767       4/2014
CN            205292846       6/2016
(Continued)

OTHER PUBLICATIONS

Hu et al. CN 108583729A A kind of automated guded vehicle suspension supporting mechanism, English Machine Translation, ip.com (Year: 2007).*
(Continued)

*Primary Examiner* — Karen Beck
(74) *Attorney, Agent, or Firm* — Norton Rose Fulbright US LLP (57) ABSTRACT

An automated guided vehicle includes a main frame (1) and a sub-frame (2); wherein, a driving wheel assembly (11) is mounted on the main frame (1), a driven wheel assembly (21) or a driving wheel (11) is mounted on the sub-frame (2), and the main frame (1) is hinged to the sub-frame (2).

14 Claims, 7 Drawing Sheets

(51) Int. Cl.
  *B62D 61/10* (2006.01)
  *B60D 1/34* (2006.01)
  *B66F 9/06* (2006.01)
  *B66F 9/075* (2006.01)
  *B60D 1/00* (2006.01)
(52) U.S. Cl.
  CPC ............ *B66F 9/063* (2013.01); *B66F 9/0755* (2013.01); *B60D 2001/001* (2013.01)
(58) Field of Classification Search
  CPC ... B60D 2001/001; B66F 9/063; B66F 9/0755
  See application file for complete search history.

(56) References Cited

U.S. PATENT DOCUMENTS

| | | | | |
|---|---|---|---|---|
| 2006/0070783 | A1* | 4/2006 | Dziak | B60P 3/125 280/767 |
| 2013/0140791 | A1 | 6/2013 | Eckert et al. | |

FOREIGN PATENT DOCUMENTS

| | | | | |
|---|---|---|---|---|
| CN | 105730553 | | | 7/2016 |
| CN | 106741299 | A | * | 5/2017 |
| CN | 206288099 | | | 6/2017 |
| CN | 206336350 | U | * | 7/2017 |
| CN | 207015475 | | | 2/2018 |
| CN | 207291549 | U | * | 5/2018 |
| CN | 108583729 | A | * | 9/2018 |
| CN | 111674490 | A | * | 9/2020 |
| CN | 113119678 | A | | 7/2021 |
| DE | 102006046406 | | | 2/2008 |
| DE | 102010015439 | | | 10/2011 |
| JP | S62-244897 | | * | 10/1987 |
| JP | 2769636 | | * | 6/1998 |

OTHER PUBLICATIONS

Yi et al. CN 106741299 A kind of merchandising machine poeple's body structure based on Mecanum wheel, English Machine Translation, ip.com (Year: 2016).*
International Search Report and Written Opinion issued in corresponding PCT application No. PCT/CN2018/099208, dated Sep. 27, 2018 (English translation of International Search Report provided).
Extended European Search Report issued in Corresponding European Application No. 18844198.4, dated Jul. 13, 2020.

* cited by examiner

AUTO-GUIDE TRANSPORT VEHICLE

CROSS-REFERENCE TO RELATED APPLICATIONS

The present application is a national phase under 35 U.S.C. § 371 of International Application No. PCT/CN2018/099208, filed Aug. 7, 2018, which claims priority to Chinese Patent Application No. 201710677905.6, filed with the China National Intellectual Property Administration on Aug. 9, 2017, and entitled "Automated Guided Vehicle", the entire contents of each of which are incorporated herein by reference in their entirety.

TECHNICAL FIELD

The present invention relates to the field of automated guided transport technology, and in particular to an automated guided vehicle.

BACKGROUND

An automated guided vehicle (AGV) is a transport vehicle that is equipped with such as electromagnetic or optical automatic guiding settings, is capable of movement along a defined guide path, and has safety protection and various load transfer features. Automated guided vehicles belong to the category of wheeled mobile robots (WMRs).

In the prior art, generally, the vehicle body of the automated guided vehicle is provided with a driving wheel assembly and a driven wheel assembly; and the driving wheel assembly is rigidly connected to the vehicle body. Although the rigid connection between the driving wheel assembly and the vehicle body simplifies the structure, the automated guided vehicle has poor adaptability to the ground.

SUMMARY

The present invention provides an automated guided vehicle with prominent adaptability to the ground.

In a first aspect, an embodiment of the present invention provides an automated guided vehicle including a main frame and a sub-frame; wherein a driving wheel assembly is mounted on the main frame, a driven wheel assembly or a driving wheel assembly is mounted on the sub-frame, and the main frame is hinged to the sub-frame.

In conjunction with the first aspect, in a first implementation of the first aspect, the sub-frame is inside the main frame.

In conjunction with the first aspect, in a second implementation of the first aspect, a motion limiter is provided between the main frame and the sub-frame.

In conjunction with the second implementation of the first aspect, in a third implementation of the first aspect, the motion limiter includes a motion limiter plate and a motion limiter post; wherein the motion limiter plate is fixed to the main frame, and has a motion limiter hole provided thereon; the motion limiter post passes through the motion limiter hole and then is connected to the sub-frame at an end; and the motion limiter post has an escape preventing structure or an escape preventing component at the other end for preventing the other end from escaping from the motion limiter hole.

In conjunction with the second implementation of the first aspect, in a fourth implementation of the first aspect, a motion limiter post hinge seat is provided on the sub-frame, and the motion limiter post passes through the motion limiter hole and is then hinged to the motion limiter post hinge seat at an end.

In conjunction with the third implementation of the first aspect, in a fifth implementation of the first aspect, a spring is disposed around the motion limiter post, between the motion limiter plate and the sub-frame.

In conjunction with the first aspect or any one of the first to fifth implementations of the first aspect, in a sixth implementation of the first aspect, the automated guided vehicle further includes a carrying platform, which is hinged to both the main frame and the sub-frame.

In conjunction with the sixth implementation of the first aspect, in a seventh implementation of the first aspect, the carrying platform is hinged to the main frame via a first hinge assembly, and is hinged to the sub-frame via a second hinge assembly.

In conjunction with the seventh implementation of the first aspect, in an eighth implementation of the first aspect, at least one of the first hinge assembly and the second hinge assembly is a double hinge configuration or a linkage mechanism.

In conjunction with the seventh implementation of the first aspect, in a ninth implementation of the first aspect, the first hinge assembly includes a first pin seat, a first pin and a first link plate; wherein the first pin seat is provided at an end of the carrying platform, and wherein the first link plate is rotatably connected to the first pin seat via the first pin at an end, and the first link plate is fixed to the main frame at the other end.

In conjunction with the seventh implementation of the first aspect, in a tenth implementation of the first aspect, the second hinge assembly includes a second pin seat, a second pin, a second link plate, a third pin seat and a third pin; wherein the second pin seat is provided at the other end of the carrying platform, the third pin seat is fixed to the sub-frame, the second link plate is rotatably connected to the second pin seat via the second pin at an end, and the second link plate is rotatably connected to the third pin eat via the third pin at the other end.

In conjunction with the first aspect, in an eleventh implementation of the first aspect, a first mounting plate is provided on each lateral side of the main frame, and the driving wheel assembly is mounted on the first mounting plate.

In conjunction with the eleventh implementation of the first aspect, in a twelfth implementation of the first aspect, the driving wheel assembly includes a second mounting plate, a transmission component, a driving wheel and a motor; wherein the transmission component is fixed to the second mounting plate, and the transmission component has an input end connected to the motor and an output end connected to the driving wheel; and wherein the driving wheel assembly is mounted on the first mounting plate via the second mounting plate.

In conjunction with the first aspect, in a thirteenth implementation of the first aspect, the driving wheel assembly includes a first driving wheel assembly and a second driving wheel assembly; wherein the first driving wheel assembly and the second driving wheel assembly are mounted on a middle portion of either lateral side of the automated guided vehicle respectively.

In conjunction with the first aspect, in a fourteenth implementation of the first aspect, a driven wheel assembly mounting plate is provided on the sub-frame, and the driven wheel assembly is mounted on the driven wheel assembly mounting plate; or wherein a driving wheel assembly mounting plate is provided on the sub-frame, and the driving wheel assembly is mounted on the driving wheel assembly mounting plate.

In conjunction with the tenth implementation of the first aspect, in a fifteenth implementation of the first aspect, a driven wheel assembly mounting plate is provided on the main frame, and a driven wheel assembly is mounted on the driven wheel assembly mounting plate.

In conjunction with the first aspect or the thirteenth implementation of the first aspect, in a sixteenth implementation of the first aspect, the sub-frame is hinged to the main frame at a position deviating from a center of the main frame toward a lateral end of the main frame.

It can be seen from the above technical solutions, an automated guided vehicle is provided by an embodiment of the present invention. A first wheel assembly is mounted on the main frame, a second wheel assembly is mounted on the sub-frame. The main frame and the sub-frame are hinged with each other. When the automated guided vehicle moves on a rough ground, the sub-frame may swing up and down relative to the main frame, so that wheels mounted on the main frame and wheels mounted on the sub-frame are in contact with the ground. Therefore, the automated guided vehicle can have prominent adaptability to the ground.

BRIEF DESCRIPTION OF DRAWINGS

In order to more clearly describe the technical solutions of embodiments of the present invention and the prior art, drawings for the embodiments of the present invention and the prior art will be briefly described below. Obviously, the drawings described below are for only some embodiments of the present invention, and those skilled in the art may also obtain other drawings based on these drawings described herein without any creative efforts.

DETAILED DESCRIPTION

To make the objective, technical solutions, and advantages of the present invention more comprehensive, a detailed description will be given below in connection with embodiment and with reference to the accompanying drawings. Obviously, the described embodiments are only some instead all of the embodiments of the present invention. Any other embodiments obtained by those skilled in the art based on the embodiments described herein without creative efforts are within the scope of protection of the present invention.

First Mode

Figure 1:
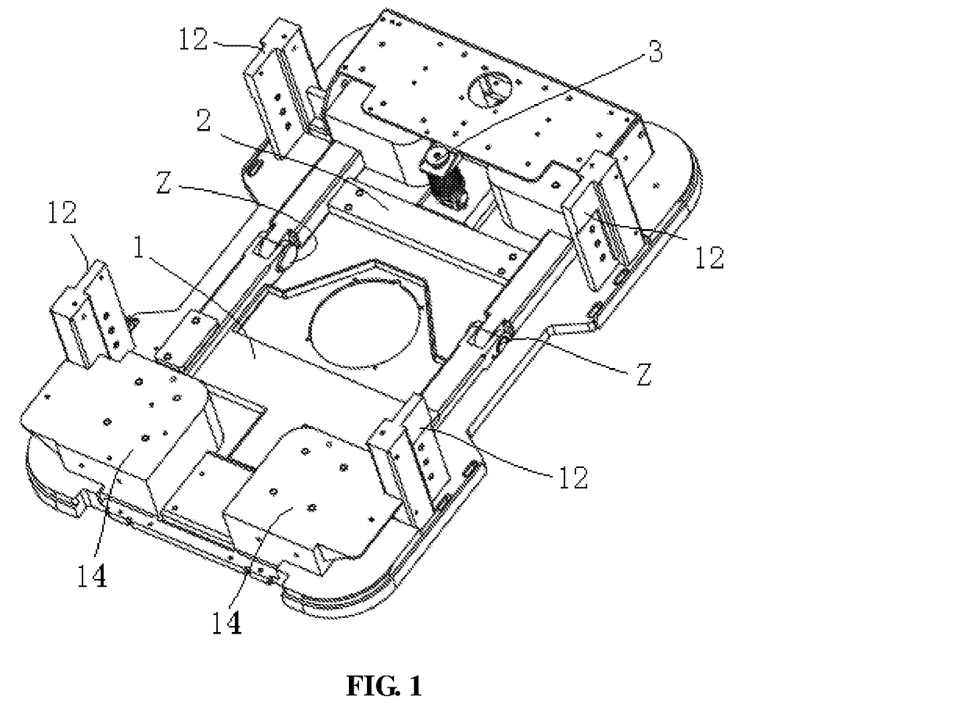
FIG. 1 is a perspective view of the framework of an automated guided vehicle provided by a first mode of the present invention.
Figure 3:
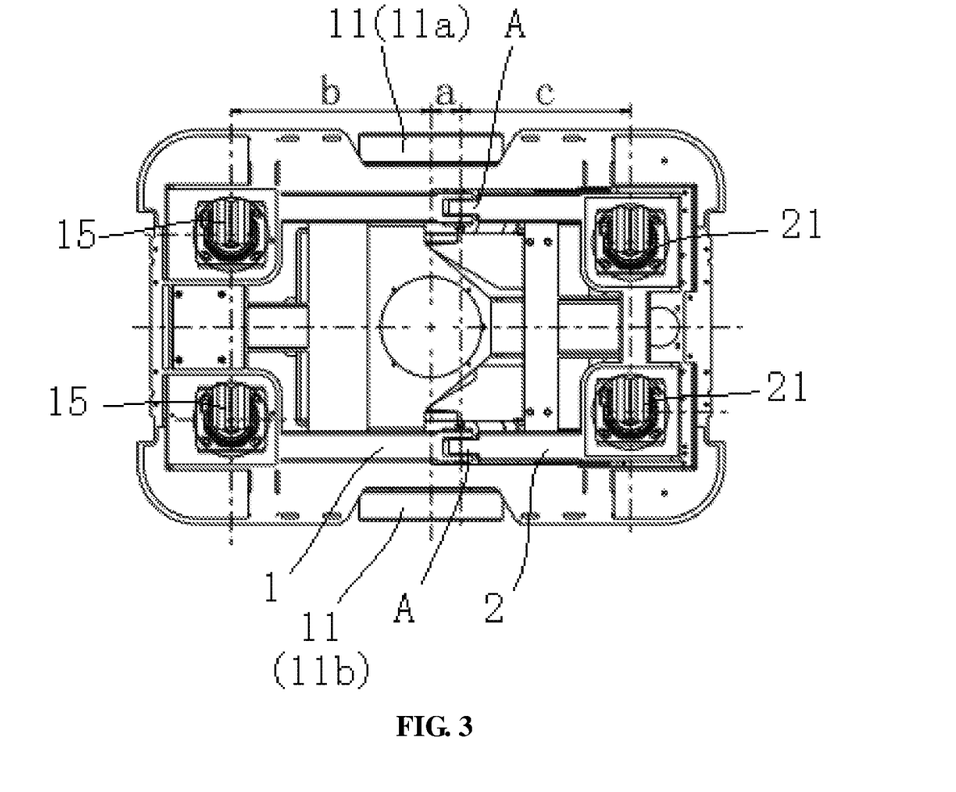
FIG. 3 is a bottom view of the framework of an automated guided vehicle provided by the first mode the present invention.

An embodiment of the present invention provides an automated guided vehicle, which can be used for transportation in support of such as warehousing and distribution, package delivery, and receiving, transferring or sending goods in manufacturing production lines. Referring to FIGS. 1 and 3, the embodiment of the automated guided vehicle includes a main frame 1 and a sub-frame 2. Driving wheel assemblies 11 are mounted on the main frame 1, and driven wheel assemblies are mounted on the sub-frame 2. The main frame 1 and the sub-frame 2 are hinged to each other.

In the embodiment, the main frame 1 and the sub-frame 2 together form a vehicle body, also called a framework or chassis, which is a base structure for supporting other components mounted thereon. The main frame 1 and the sub-frame 2 may be made by such as machining or welding of members, or may be made by casting. On the main frame 1 or the sub-frame 2, there may be arranged an operation mechanism such as a load transfer platform or a lifting apparatus. A conveyor belt can be provided on the surface of the load transfer platform to receive, transfer and send goods or baskets. The operation mechanism such as the load transfer platform or the lifting apparatus may be arranged on the main frame 1 or may be arranged across the main frame 1 and the sub-frame 2.

The hinge of the sub-frame 2 to the main frame 1 allows the sub-frame 2 to be swingable up and down relative to the main frame 1. Optionally, the sub-frame 2 is swingable up and down relative to the main frame 1 at an angle ranging from 0 to 90 degrees.

The automated guided vehicle may be equipped with units having guidance features, for example vision guidance. Such units may operate by identifying a two-dimensional bar code arranged on the ground to allow the automated guided vehicle to navigate.

The main frame 1 is hinged with the sub-frame 2. As an implementation, the sub-frame 2 may be connected to the main frame 1 at an end. On the other end, one or more sets of driven wheel assemblies 21 may be mounted. The present invention is not limited thereto, and the sub-frame 2 may also be hinged to the main frame 1 at a side portion.

The main frame 1 and the sub-frame 2 may be hinged together by holes and pins receiving through the holes. Specifically, referring to FIG. 4 and FIG. 5, the main frame 1 has holes 13 formed therein, and the sub-frame 2 has corresponding holes 23 formed therein. The sub-frame 2 is hinged to the main frame 1 by pins Z receiving through the holes 13 and 23. The connection positions where the main frame 1 and the sub-frame 2 are hinged are depicted at reference signs A as shown in FIG. 3.

The sub-frame 2 may also be hinged to the main frame 1 via a hinge assembly. Specifically, the hinge assembly may include a first link plate, a second link plate, and a pin. The first link plate and the second link plate may be connected by the pin, the first link plate may be secured on the main frame 1, and the second link plate may be secured on the sub-frame 2.

Referring to FIG. 3, in an embodiment, the driving wheel assemblies 11 are mounted on the main frame 1. The driven wheel assemblies 21 are mounted on the sub-frame 2. The sub-frame 2 is hinged to the main frame 1. When the automated guided vehicle moves on a rough ground, the sub-frame 2 may swing up and down relative to the main frame 1, to allow driving wheels mounted on the main frame 1 and driven wheels mounted on the sub-frame 2 to remain contact with the ground. This provides the automated guided vehicle with prominent adaptability to the ground. Further, in case of a sunken ground, due to the hinge configuration of the main frame 1 and the sub-frame 2, in addition to the well contact of the driving wheels and the driven wheels with the ground, the driving wheels can have a large pressing force applied on the ground. The heavier the load on the vehicle is, the greater the force on the ground applied by the driving wheels will be, and thereby the greater the driving force on the driving wheel will be. The automated guided vehicle can thus have a higher loading capacity. In general, this embodiment provides an automated guided vehicle having prominent adaptability to the ground and higher loading performance.

In the embodiment, the sub-frame 2 may be inside the main frame 1. In this case, the main frame 1 defines the overall size of the automated guided vehicle. On the outside of the main frame 1, for example, a housing or a sensor may be mounted, and on the inside, various mechanical or electrical elements may be mounted.

Figure 2:
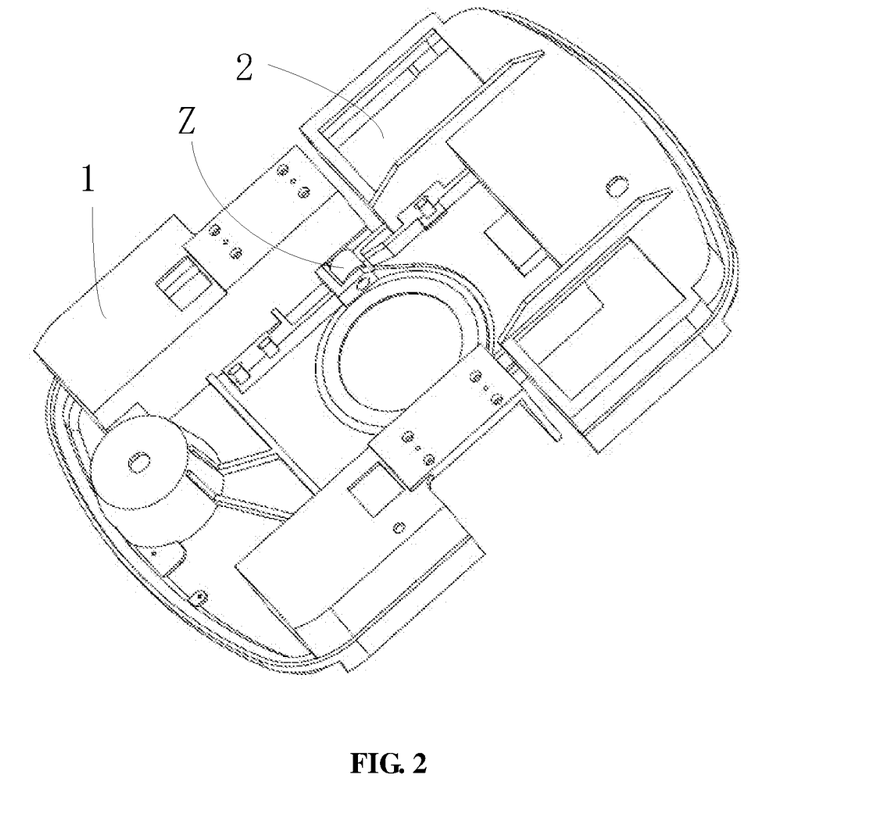
FIG. 2 is a diagram illustrating the hinge of a main frame and a sub-frame provided by an embodiment of the present invention.

In another optional embodiment, the sub-frame 2 may also be positioned outside the main frame 1, as shown in FIG. 2. Specifically, the sub-frame may be hinged to an end of the main frame 1 on the outside by the pins Z. In such case, the overall size of the automated guided vehicle may be defined by the main frame 1 and the sub-frame 2 together. On the outside of the main frame 1 and the sub-frame 2, for example, a housing or a sensor may be mounted; and on the inside, various mechanical or electrical elements may be mounted.

Figure 4:
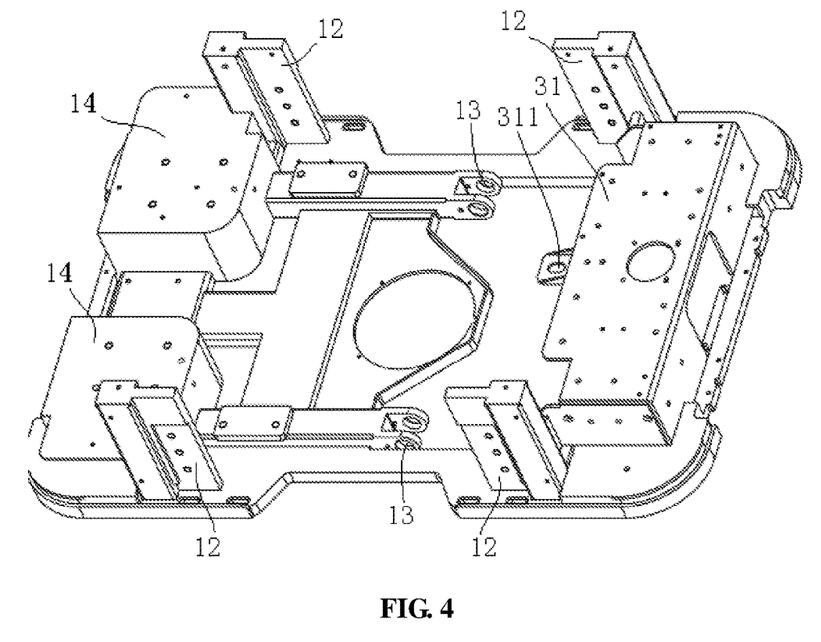
FIG. 4 is a perspective view of a main frame of the framework in FIG. 1.

In order to make the entire vehicle body of the automated guided vehicle more compact and to facilitate a stable installation of components such as the housing and the sensor, referring to FIG. 1 and FIG. 3, in the embodiment, the sub-frame 2 is inside the main frame 1. Specifically, the main frame 1 may be formed in a substantially U-shape at an end, such as at the front end or the rear end. The sub-frame 2 is arranged in the U-shaped structure and hinged to the main frame 1. That means, the main frame 1 surrounds the sub-frame 2 at an end to form a forward end or a rearward end of the automated guided vehicle, and is hinged with the sub-frame 2. In an embodiment, the main frame 1 surrounds the sub-frame 2 at an end, forming the forward end of the automated guided vehicle. In embodiments, for example as shown in FIGS. 1, 2, and 4, the sub-frame 2 is hinged to the main frame 1, and is received within the U-shaped structure of the main frame 1 such that the sub-frame 2 does not increase the overall length or width of the main frame 1. In the first mode, the sub-frame 2 is inside the main frame 1. The main frame 1 may serve as an integral mounting for components for example the housing and the sensor. While the sub-frame 2 swings up and down relative to and within the main frame 1, the sub-frame 2 will not adversely affect the components mounted on the main frame 1, e.g., the housing and the sensor, thereby maintaining such components in a relatively stable condition.

When the automated guided vehicle moves on a rough ground, the sub-frame 2 may swing up and down relative to the main frame 1. In order to control the amplitude of the up and down swing of the sub-frame 2 relative to the main frame 1, a motion limiter 3 is provided between the main frame 1 and the sub-frame 2, as shown in FIG. 1.

The motion limiter 3 may be a motion limiting configuration such as a limiting pin, a limiting post or a limiting protrusion. In an implementation, referring to FIG. 4 and FIG. 6, the motion limiter 3 includes a motion limiter plate 31 and a motion limiter post 32. The motion limiter plate 31 is secured on the main frame 1 and has a motion limiter hole 311 formed thereon. For example, as shown in FIG. 1 and FIG. 4, the length of the motion limiter plate 31 extends above where the sub-frame 2 may be positioned. The motion limiter post 32 passes through the motion limiter hole 311 and then connected to the sub-frame 2 at an end. The motion limiter post has an escape preventing mechanism or escape preventing component at the other end for preventing the other end from escaping from the motion limiter hole. The end of the motion limiter post 32 passing through the motion limiter hole 311 may be hinged to the sub-frame 2. Specifically, a motion limiter post hinge seat 24 is provided on the sub-frame 2, and the end of the motion limiter post 32 passing through the motion limiter hole 311 is hinged to the motion limiter post hinge seat 24.

Figure 6:
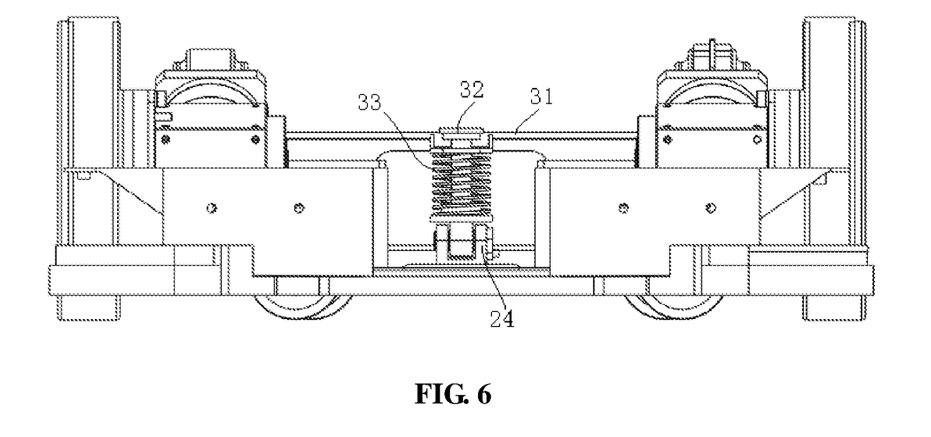
FIG. 6 is a partial view of the automated guided vehicle provided by the first mode the present invention.

An end portion is formed at the other end of the motion limiter post 32, which has a larger size than other portions of the motion limiter post and serves as an escape preventing configuration. Specifically, the size of the end portion at the other end of the motion limiter post 32 is larger than the size of the motion limiter hole 311, such that the end portion at the other end cannot pass through the motion limiter hole 311. That is, the end portion at the other end of the motion limiter post 32 is stuck in the motion limiter hole 311 such that the sub-frame 2 is prevented from further rotating relative to the main frame 1.

The escape preventing component may be a cotter pin that is received through the other end of the motion limiter post.

Further, referring to FIG. 6, a spring 33 is disposed around the motion limiter post 32, between the motion limiter plate 31 and the sub-frame 2. When the automated guided vehicle moves on a rough ground, the compression of the spring 33 may cushion or damp the sub-frame 2. The motion limiter in the embodiment provides not only a motion limiting function but also a cushioning or damping function. Further, with the motion limiter post 32, the spring 33 and the hinge configuration between the main frame 1 and the sub-frame 2, the driving wheels mounted on the main frame 1 and the driven wheels mounted on the sub-frame 2 are all kept in contact with the ground. This provides the automated guided vehicle with not only prominent adaptability to the ground but also high movement stability. In an alternative implementation, a cushion pad may be provided between the main frame 1 and the sub-frame 2 for cushioning. In the embodiment, the spring 33 is disposed around the motion limiter post 32 forming an elastic motion limiter. In addition to the motion limiting function and the cushioning or damping function, the elastic motion limiter enhances the contact of the driving wheels and the driven wheels with the ground by means of the elastic force of the spring 33, thereby improving the movement stability of the automated guided vehicle.

In the embodiment, the driving wheel assemblies 11 are mounted on the main frame 1. For example, the driving wheel assemblies 11 may be elastically connected to the main frame 1.

When the automated guided vehicle moves on a rough ground, the sub-frame 2 swings up and down relative to the main frame 1 so that the driving wheels and the driven wheels can well adapt to the ground. In this case, in order to increase the driving force of the driving wheels, the driving wheel assemblies 11 may be rigidly connected to both sides of the main frame 1 respectively. Specifically, referring to FIG. 4 and FIG. 10, the main frame 1 is provided with first mounting plates 12 on both sides, and the driving wheel assemblies 11 are mounted on the first mounting plates 12.

Figure 7:
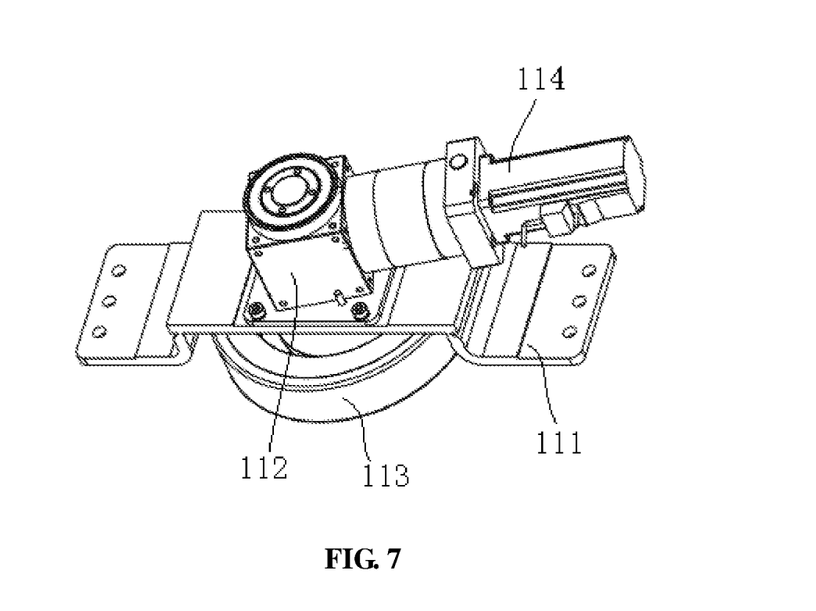
FIG. 7 is a perspective view of a driving wheel assembly in the first mode of the present invention.

Referring to FIG. 7, the driving wheel assembly 11 may include: a second mounting plate 111, a transmission component 112, a driving wheel 113 and a motor 114. The transmission component 112 is fixed to the second mounting plate 111. The transmission component 112 has an input end connected to the motor 114 and an output end connected to the driving wheel 113. The driving wheel assembly 11 is mounted on the first mounting plate 12 via the second mounting plate 111. The motor supplies motive power for the automated guided vehicle. The transmission component 112 may be any transmission device including, but not limited to, a speed reducer, a synchronous belt or a chain. This embodiment employs a speed reducer as the transmission component 112.

In the embodiment, the second mounting plate 111, the transmission component 112, the driving wheel 113 and the motor 114 may be assembled in advance to form the driving wheel assembly 11. The driving wheel assembly 11 is then integrally mounted to the main frame 1. Such a modular mounting improves assembly efficiency and facilitates easy disassembly and maintenance.

In the embodiment, referring to FIG. 3, the driving wheel assemblies 11 include a first driving wheel assembly 11a and a second driving wheel assembly 11b. The first driving wheel assembly 11a and the second driving wheel assembly 11b are symmetrically mounted on either side of the main frame 1. In order for a differential control of the driving wheel in the first driving wheel assembly 11a and the driving wheel in the second driving wheel assembly 11b, the driving wheel in the first driving wheel assembly 11a and the driving wheel in the second driving wheel assembly 11b are connected to two separate driving systems respectively, with each driving wheel driven by a respective driving system independently.

In the embodiment, the first driving wheel assembly 11a and the second driving wheel assembly 11b each is mounted on or substantially on the middle portion of a side of the automated guided vehicle. That is, the first driving wheel assembly 11a and the second driving wheel assembly 11b can be arranged symmetrically to the center of the automated guided vehicle. Such configuration facilitates the control of on-spot rotation of the automated guided vehicle, and also enables the driving wheels in the driving wheel assemblies to serve as main bearing wheels to contact with the ground, and enables the driven wheels to serve as auxiliary wheels to contact with the ground stably. The two sides of the automated guided vehicle refer to the two sides of the vehicle body of the automated guided vehicle. If the sub-frame 2 is inside the main frame 1, the middle portion of a side of the automated guided vehicle refers to the middle portion of the side of the main frame 1. If the sub-frame 2 is not inside the main frame 1, the middle portion of the side of the automated guided vehicle may be defined by the size of the main frame 1 and the size of the sub-frame 2 together.

Further, referring to FIG. 3, the sub-frame 2 is hinged to the main frame 1 at a position deviating from the center of the main frame 1 toward a lateral end of the main frame 1. This further ensures that the driving wheels in the driving wheel assemblies serve as main bearing wheels to contact with the ground, and that the driven wheels serve as auxiliary wheels to contact with the ground stably.

Figure 5:
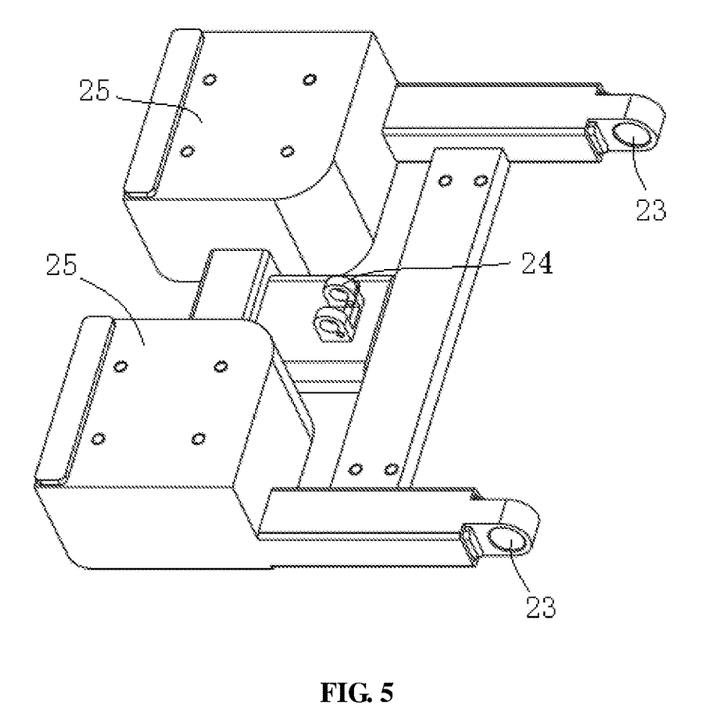
FIG. 5 is a perspective view of a sub-frame of the framework in FIG. 1.

Similarly, in order to facilitate modular assembly, referring to FIG. 5, the sub-frame 2 is provided with driven wheel assembly mounting plates 25. The driven wheel assembly 21 can be mounted on the driven wheel assembly mounting plate 25. There may be one driven wheel assembly 21 or two driven wheel assemblies 21.

In order to increase the movement stability of the automated guided vehicle, referring to FIG. 1 to FIG. 4, driven wheel assembly mounting plates 14 may be additionally provided on an end of the main frame 1 (the forward end or the rearward end of the vehicle body), and a driven wheel assembly 15 is mounted on the driven wheel assembly mounting plate 14. There may be one driven wheel assembly 15 or two driven wheel assemblies 15.

The driven wheel assembly 21 may be rigidly connected to, elastically connected to or rotationally connected to the main frame 1 or the sub-frame 2. The driven wheel assembly 21 may be a caster-type wheel or a fixed-axis wheel. The driving wheel may be, but not limited to, a polyurethane wheel, rubber wheel, or the like.

In the embodiment, the driving wheel assemblies and the driven wheel assemblies share the load on the vehicle body. The driving wheel assemblies 11 can provide motive power for various motions of the automated guided vehicle.

It should be noted that, in the embodiment, the driven wheel assembly 15 mounted on the main frame 1 and/or the driven wheel assembly 21 mounted on the sub-frame 2 may also be replaced with a driving wheel assembly. Specifically, a driving wheel assembly mounting plate may be provided on the main frame 1 and/or the sub-frame 2, and the driving wheel assembly is mounted on the driving wheel assembly mounting plate. This driving wheel assembly may have a configuration similar to the driving wheel assembly on the main frame, which will not be repeated herein. Of course, a driven wheel assembly and a driving wheel assembly may be mounted on the sub-frame 2 at the same time.

Second Mode

Figure 8:
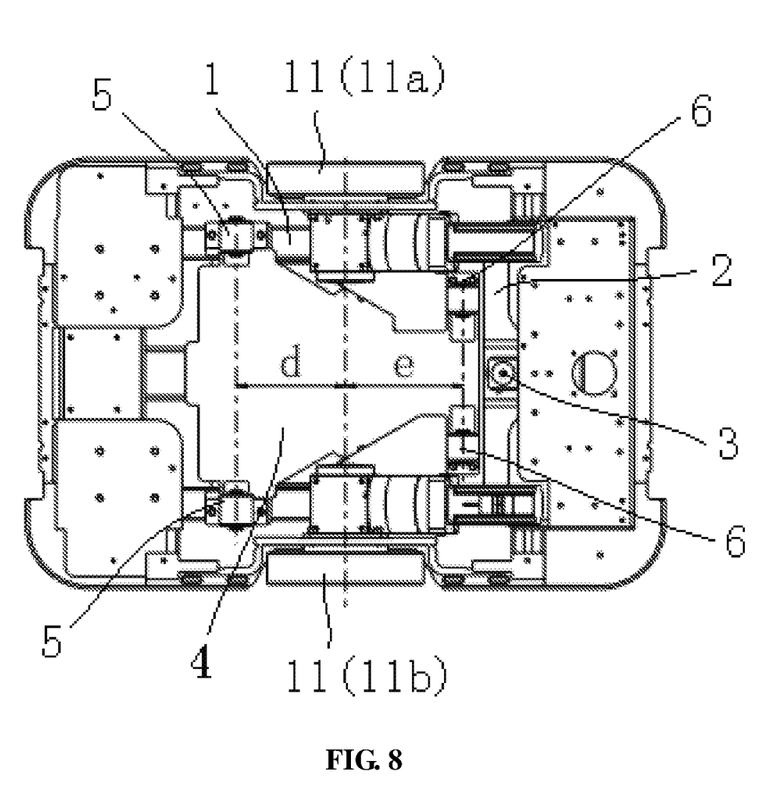
FIG. 8 is a top view of an automated guided vehicle provided by a second mode of the present invention.
Figure 10:
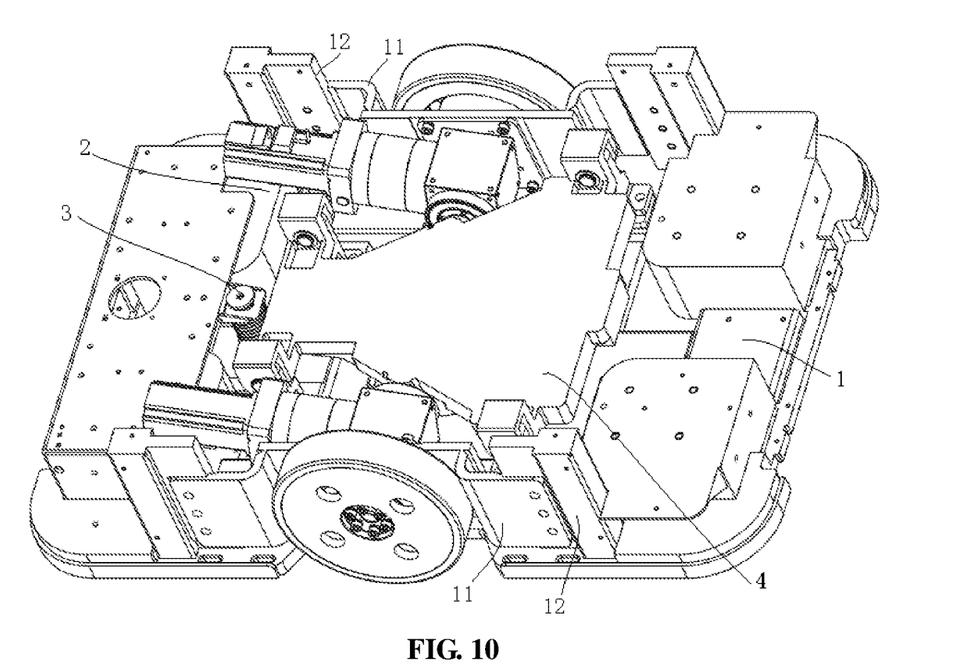
FIG. 10 is a perspective view of the automated guided vehicle provided by the second mode the present invention.

On the basis of the first mode, in the second mode, referring to FIG. 8 and FIG. 10, the automated guided vehicle further includes a carrying platform 4 and the carrying platform 4 is hinged to the main frame 1 and the sub-frame 2 respectively.

The carrying platform 4 may be of a frame structure or a plate-like structure, and may be used as an operation mechanism, such as a load transfer mechanism, a turnover mechanism or a lifting mechanism, for the automated guided vehicle, or as a supporting carrier for other functional assemblies or even for an object to be transported. The automated guided vehicle is operable to complete tasks through the operation mechanism. This embodiment employs a carrying platform having a plate-like structure similar to a triangle.

The hinging of the carrying platform 4 to the main frame 1 and the sub-frame 2 allows the carrying platform 4 to swing up and down relative to the main frame 1 and to swing up and down relative to the sub-frame 2. In this way, even if the automated guided vehicle is moving on a surface full of bumps and holes, the carrying platform 4 can stay in a relatively stable, such as horizontally stable, by adapting itself to the surface, thereby maintaining the operation mechanism or the other functional assemblies supported thereon relatively stable.

In the embodiment, the main frame 1 and the sub-frame 2 are hinged to each other and the carrying platform 4 is hinged to both the main frame 1 and the sub-frame 2. Such configuration allows the automated guided vehicle to be well adapted to a rough ground by keeping the driving wheels mounted on the main frame 1 and the driven wheels mounted on the sub-frame 2 in contact with the ground. In addition to the prominent adaptability to the ground, with the hinging between the main frame 1 and the sub-frame 2, the driving wheels can apply a large pressing force on the ground and thus have a strong driving force. The hinging of the carrying platform 4 to the main frame 1 and to the sub-frame 2 enables the carrying platform 4 to stay in a relatively stable state by adapting itself to the ground and thus keep the operation mechanism or the other functional assemblies thereon relatively stable. This ensures the stability of the operation mechanism or other functional assemblies during the operation of the automated guided vehicle. That is to say, by adapting to the rough ground by means of the hinge connection of the carrying platform 4 to the main frame 1 and the sub-frame 2, the driving wheels can serve as main bearing wheels to contact with the ground, and the driven wheel can serve as auxiliary wheels to stably contact with the ground. Therefore, the automated guided vehicle can have prominent adaptability to the ground, high load capacity and movement stability.

In the embodiment, the carrying platform 4 is hinged to the main frame 1, and the carrying platform 4 is hinged to the sub-frame 2. As an alternative implementation, the carrying platform 4 is hinged to the main frame 1 at an end, and the carrying platform 4 is hinged to the sub-frame 2 at the other end. The present invention is not limited thereto, and the carrying platform 4 may also be hinged to the main frame 1 and the sub-frame 2 at a side portion.

The hinge connection of the carrying platform 4 to the main frame 1 may be similar to the hinge connection of the sub-frame 2 to the main frame 1. This applies to the hinge connection of the carrying platform 4 to the sub-frame 2.

As an alternative implementation, the carrying platform 4 is hinged to the main frame 1 via a first hinge assembly 5, and is hinged to the sub-frame 2 via a second hinge assembly 6.

Further, in order for the carrying platform 4 to better adapt itself according to road conditions to be a relatively stable, at least one of the first hinge assembly 5 and the second hinge assembly 6 is a hinge assembly with more than two degrees of freedom. Specifically, at least one of the first hinge assembly and the second hinge assembly is a double hinge configuration or a linkage mechanism.

In this embodiment, the first hinge assembly 5 is a hinge assembly with one degree of freedom, and the second hinge assembly 6 is a hinge assembly with two degrees of freedom, i.e., a double hinge configuration.

Figure 9:
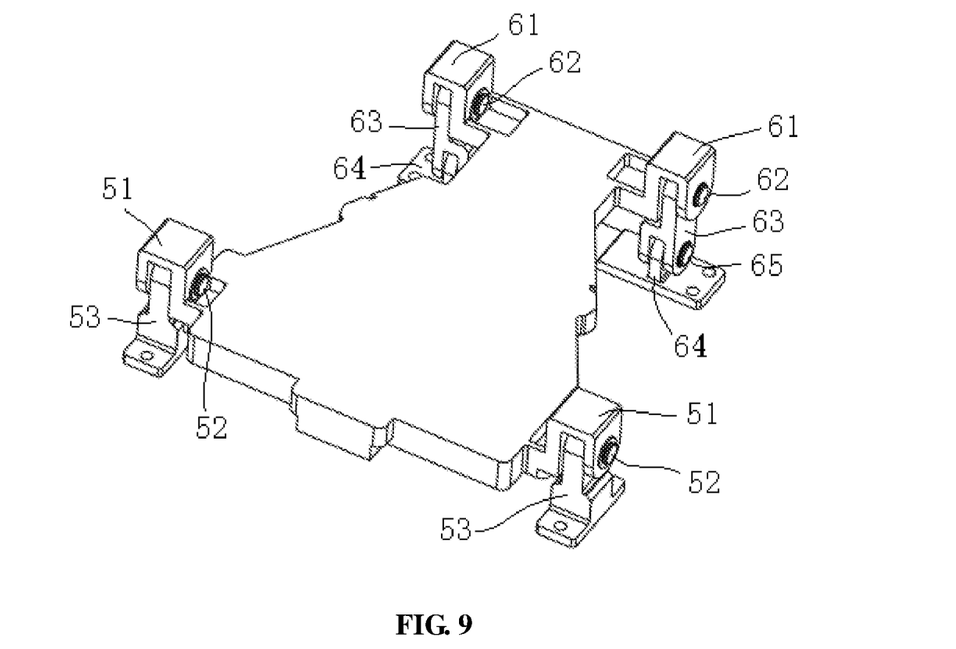
FIG. 9 is a perspective view of a carrying platform of the automated guided vehicle in FIG. 8.

Specifically, referring to FIG. 9, the first hinge assembly 5 includes a first pin seat 51, a first pin 52 and a first link plate 53. The first pin seat 51 is provided at an end of the carrying platform 4. The first link plate 53 is rotatably connected to the first pin seat 51 via the first pin 52 at an end, and the first link plate 53 is fixed to the main frame 1 at the other end. The first pin seat 51 may be formed integral with the carrying platform 4, or may be detachably fixed to the carrying platform 4. The first link plate 53 may be formed integral with the main frame 1, or may be detachably fixed to the main frame 1.

The second hinge assembly 6 includes a second pin seat 61, a second pin 62, a second link plate 63, a third pin seat 64, and a third pin 65. The second pin seat 61 is provided at the other end of the carrying platform 4. The third pin seat 64 is fixed to the sub-frame 2. The second link plate 63 is rotatably connected to the second pin seat 61 via the second pin 62 at an end, and is rotatably connected to the third pin seat 64 via the third pin 65 at the other end. The second pin seat 61 may be formed integral with the carrying platform 4, or may be detachably fixed to the carrying platform 4. The third pin seat 64 may be formed integral with the sub-frame 2, or may be detachably fixed to the sub-frame 2.

In the embodiment, referring to FIG. 10, the motion limiter 3 is arranged at a position close to an end of the carrying platform 4, so that the displacement of the main frame 1, the sub-frame 2 and the carrying platform 4 with respect to each other may be limited by the motion limiter.

In the embodiment, there is a certain relative proportional relationship among the position where the sub-frame 2 is hinged to the main frame 1, the position where the carrying platform 4 is hinged to the main frame 1, and the position where the carrying platform 4 is hinged to the sub-frame 2. Under certain working conditions, the distribution of the load over the wheels varies depending on the proportional relationship among the hinging positions. Therefore, the proportional relationship among the hinging positions may be set in a way such that the load distributed on the driving wheels can be effectively increased and the load distributed on the driven wheels be decreased. The resistance of the driven wheels can thereby be reduced, ensuring the service life of the driven wheels and improving the motive performance of the automated guided vehicle.

Further, referring to FIG. 3 and FIG. 8, the distribution of the load on the wheel assemblies is determined by the proportional relationship among distances indicated by reference signs a, b, c, d, and e as shown in FIGS. 3 and 8, where a depicts the lateral distance between the center of the driving wheel assembly 11 of the main frame 1 and the position where the sub-frame 2 is hinged to the main frame 1; b depicts the lateral distance between the center of the driven wheel assembly 15 on the sub-frame 2 and the center of the driving wheel assembly 11 of the main frame 1; c depicts the lateral distance between the center of the driven wheel assembly 21 on the sub-frame 2 and; the position where the sub-frame 2 is hinged to the main frame 1; d depicts the lateral distance between the position where the carrying platform 4 is hinged to the main frame 1 and the center of the driving wheel assembly 11 of the main frame 1; and e depicts the lateral distance between the position where the carrying platform 4 is hinged to the sub-frame 2 and the center of the driving wheel assembly 11 of the main frame 1. By setting the proportional relationship among these positions, the load distributed on the driving wheels can be effectively increased, the load on the driven wheels can be effectively decreased, and thereby the resistance of the driven wheels can be effectively reduced, which ensures the service life of the driven wheels and improve the motive performance of the automated guided vehicle. Even on a rough ground, the driving wheels and the driven wheels can be in contact with the ground with a certain pressing force applied on the ground, so that the automated guided vehicle has prominent adaptability to grounds and movement stability.

It should be noted that the relationship terms herein, such as "first", "second" and the like are only used to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles or devices, including a series of elements, include not only those elements that have been listed, but also other elements that are not specifically listed or elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments herein are described in a correlated manner, and description of a component in an embodiment may apply to another containing an identical or similar component. The description for each embodiment focuses on the differences from other embodiments.

The embodiments described above are simply preferable embodiments of the present invention, and are not intended to limit the scope of protection of the present invention. Any modifications, alternatives, improvements, or the like within the spirit and principle of the present invention shall be included within the scope of protection of the present invention.

The invention claimed is:

1. An automated guided vehicle, comprising a main frame and a sub-frame; wherein a driving wheel assembly is mounted on the main frame, a driven wheel assembly or a driving wheel assembly is mounted on the sub-frame, and the sub-frame is hinged to the main frame,
   wherein the sub-frame is inside the main frame which defines the overall size of the automated guided vehicle, and
   wherein, a housing and a sensor are mounted on the main frame, and the main frame serves as an integral mounting for the housing and the sensor,
   wherein a first mounting plate is provided on each lateral side of the main frame, and the driving wheel assembly is mounted on the first mounting plate; and
   wherein the driving wheel assembly comprises a second mounting plate, a transmission component, a driving wheel and a motor; wherein the transmission component is fixed to the second mounting plate, and the transmission component has an input end connected to the motor and an output end connected to the driving wheel; and wherein the driving wheel assembly is mounted on the first mounting plate via the second mounting plate.

2. The automated guided vehicle according to claim 1, wherein a motion limiter is provided between the main frame and the sub-frame.

3. The automated guided vehicle according to claim 2, wherein the motion limiter comprises a motion limiter plate and a motion limiter post; wherein
   the motion limiter plate is fixed to the main frame, and has a motion limiter hole provided thereon; and
   the motion limiter post passes through the motion limiter hole and is then connected to the sub-frame at an end, and the motion limiter post has an escape preventing configuration or an escape preventing component at the other end for preventing the other end from escaping from the motion limiter hole.

4. The automated guided vehicle according to claim 3, wherein a motion limiter post hinge seat is provided on the sub-frame, and the motion limiter post passes through the motion limiter hole and is then hinged to the motion limiter post hinge seat at an end.

5. The automated guided vehicle according to claim 3, wherein a spring is disposed around the motion limiter post, between the motion limiter plate and the sub-frame.

6. The automated guided vehicle according to claim 1, further comprising a carrying platform, which is hinged to both the main frame and the sub-frame.

7. The automated guided vehicle according claim 6, wherein the carrying platform is hinged to the main frame via a first hinge assembly, and is hinged to the sub-frame via a second hinge assembly.

8. The automated guided vehicle according to claim 7, wherein at least one of the first hinge assembly and the second hinge assembly is a double hinge configuration or a linkage mechanism.

9. The automated guided vehicle according to claim 7, wherein the first hinge assembly comprises a first pin seat, a first pin and a first link plate; wherein the first pin seat is provided at an end of the carrying platform, and wherein the first link plate is rotatably connected to the first pin seat via the first pin at an end, and the first link plate is fixed to the main frame at the other end.

10. The automated guided vehicle according to claim 7, wherein the second hinge assembly comprises a second pin seat, a second pin, a second link plate, a third pin seat and a third pin; wherein
    the second pin seat is provided at the other end of the carrying platform, the third pin seat is fixed to the sub-frame, the second link plate is rotatably connected to the second pin seat via the second pin at an end, and the second link plate is rotatably connected to the third pin seat via the third pin at the other end.

11. The automated guided vehicle according to claim 1, wherein the driving wheel assembly comprises a first driving wheel assembly and a second driving wheel assembly; wherein
    the first driving wheel assembly and the second driving wheel assembly are mounted on a middle portion of either lateral side of the automated guided vehicle respectively.

12. The automated guided vehicle according to claim 1, wherein a driven wheel assembly mounting plate is provided on the sub-frame, and the driven wheel assembly is mounted on the driven wheel assembly mounting plate; or wherein
    a driving wheel assembly mounting plate is provided on the sub-frame, and the driving wheel assembly is mounted on the driving wheel assembly mounting plate.

13. The automated guided vehicle according to claim 10, wherein a driven wheel assembly mounting plate is provided on the main frame, and a driven wheel assembly is mounted on the driven wheel assembly mounting plate.

14. The automated guided vehicle according to claim 1, wherein the sub-frame is hinged to the main frame at a position deviating from a center of the main frame toward a lateral end of the main frame.

* * * * *

UNITED STATES PATENT AND TRADEMARK OFFICE
CERTIFICATE OF CORRECTION

PATENT NO. : 11,584,460 B2  
APPLICATION NO. : 16/636878  
DATED : February 21, 2023  
INVENTOR(S) : Xiaochen Zou et al.

It is certified that error appears in the above-identified patent and that said Letters Patent is hereby corrected as shown below:

On the Title Page

Item [71] should read "HANGZHOU HIKROBOT CO., LTD."

Signed and Sealed this
Fourth Day of July, 2023

Katherine Kelly Vidal
*Director of the United States Patent and Trademark Office*